United States Patent
Honey et al.

(10) Patent No.: US 9,807,935 B2
(45) Date of Patent: Nov. 7, 2017

(54) HARVESTING CAM REEL WITH CONVERTIBLE TRANSPORT MODE

(71) Applicant: Honey Bee Manufacturing Ltd., Frontier (CA)

(72) Inventors: Gregory Honey, Frontier (CA); Glenn Honey, Frontier (CA)

(73) Assignee: HONEY BEE MANUFACTURING LTD., Frontier, SK (CA)

( * ) Notice: Subject to any disclaimer, the term of this patent is extended or adjusted under 35 U.S.C. 154(b) by 488 days.

(21) Appl. No.: 14/284,346

(22) Filed: May 21, 2014

(65) Prior Publication Data

US 2015/0272001 A1    Oct. 1, 2015

(30) Foreign Application Priority Data

Mar. 26, 2014  (CA) .................................... 2847456

(51) Int. Cl.
*A01D 57/02*       (2006.01)
*A01D 34/01*       (2006.01)
*A01D 57/20*       (2006.01)
*A01D 57/03*       (2006.01)

(52) U.S. Cl.
CPC ............. *A01D 57/02* (2013.01); *A01D 34/01* (2013.01); *A01D 57/03* (2013.01); *A01D 57/20* (2013.01)

(58) Field of Classification Search
CPC ...... A01D 57/02; A01D 34/02; A01D 34/125; A01D 34/01; A01D 57/03; A01D 57/20
USPC .......................... 56/14.3, 14.4, 220–227, 158
See application file for complete search history.

(56) References Cited

U.S. PATENT DOCUMENTS

| | | | |
|---|---|---|---|
| 12,750 A | 4/1855 | Chatfield | |
| 524,215 A | 8/1894 | Quigley | |
| 2,413,072 A | 12/1946 | Sage | |
| 2,694,894 A | 11/1954 | Linscheld | |
| 3,468,109 A | 9/1969 | Reimer | |
| 3,472,008 A | 10/1969 | Hurlburt | |
| 3,550,366 A | 12/1970 | Gibson | |
| 3,771,299 A | 11/1973 | Gradwohl et al. | |
| 3,849,974 A * | 11/1974 | James | 56/226 |
| 3,927,512 A | 12/1975 | Molzahn | |
| 3,945,180 A * | 3/1976 | Sinclair | 56/221 |
| 4,038,810 A | 8/1977 | Williams et al. | |
| 4,067,177 A | 1/1978 | Tout | |

(Continued)

FOREIGN PATENT DOCUMENTS

| | | |
|---|---|---|
| CA | 1003310 | 1/1977 |
| CA | 1040438 | 10/1978 |

(Continued)

*Primary Examiner* — Thomas B Will
*Assistant Examiner* — Mai Nguyen

(57) ABSTRACT

A cam reel for use on a harvesting header that can be configured in both operating and transport positions is provided. The reel comprises a plurality of finger-bearing reel bats disposed evenly around the reel shaft, each rotatably attached through the distal ends of radial arms extending outwardly from the reel shaft. A cam disc is attached to the frame and engages each reel bat by a cam follower, to provide rotational movement of the reel bats relative to the radial arms, during rotation of the shaft in the operating position. The cam has at least one operating position, and a transport position in which the engaged reel bats will be pivoted into transport mode that substantially reduces the risk of damage to the fingers.

17 Claims, 6 Drawing Sheets

(56) References Cited

U.S. PATENT DOCUMENTS

| | | |
|---|---|---|
| 4,120,137 A | 10/1978 | Schoenberger et al. |
| 4,127,981 A | 12/1978 | Parrish et al. |
| 4,137,696 A | 2/1979 | Webb |
| 4,156,340 A | 5/1979 | Colgan et al. |
| 4,174,602 A | 11/1979 | Webb et al. |
| 4,177,625 A | 12/1979 | Knight et al. |
| 4,187,664 A | 2/1980 | Meek et al. |
| 4,202,154 A | 5/1980 | Waldrop et al. |
| 4,270,338 A | 6/1981 | Halls |
| 4,346,909 A | 8/1982 | Hundeby |
| 4,353,201 A | 10/1982 | Pierce et al. |
| 4,435,948 A | 3/1984 | Jennings |
| 4,512,140 A | 4/1985 | Blakeslee |
| 4,519,190 A | 5/1985 | Blakeslee |
| 4,522,018 A | 6/1985 | Blakeslee |
| 4,541,229 A | 9/1985 | Elijah |
| 4,573,124 A | 2/1986 | Seiferling |
| 4,573,309 A | 3/1986 | Patterson |
| 4,612,757 A | 9/1986 | Halls et al. |
| 4,637,201 A | 1/1987 | Pruitt et al. |
| 4,641,490 A | 2/1987 | Wynn et al. |
| 4,660,361 A | 4/1987 | Remillard et al. |
| 4,662,161 A | 5/1987 | Patterson |
| 4,751,809 A | 6/1988 | Fox et al. |
| 4,776,155 A | 10/1988 | Fox et al. |
| 4,833,869 A | 5/1989 | Klein |
| 4,909,026 A | 3/1990 | Molzahn et al. |
| 4,936,082 A | 6/1990 | Majkrzak |
| 4,944,141 A | 7/1990 | Orlando et al. |
| 4,956,966 A | 9/1990 | Patterson |
| 5,005,343 A | 4/1991 | Patterson |
| 5,007,235 A | 4/1991 | Nickel et al. |
| 5,086,613 A | 2/1992 | Fox et al. |
| 5,155,983 A | 10/1992 | Sheehan et al. |
| 5,157,905 A | 10/1992 | Talbot et al. |
| 5,243,810 A | 9/1993 | Fox et al. |
| 5,261,290 A | 11/1993 | Ramsay et al. |
| 5,359,839 A | 11/1994 | Parsons et al. |
| 5,435,239 A | 7/1995 | Talbot |
| 5,459,986 A | 10/1995 | Talbot et al. |
| 5,473,872 A | 12/1995 | Fox et al. |
| 5,535,577 A | 7/1996 | Chmielewski et al. |
| 5,595,053 A | 1/1997 | Jasper et al. |
| RE35,543 E | 7/1997 | Patterson |
| 5,678,398 A | 10/1997 | Fox et al. |
| 5,681,117 A | 10/1997 | Wellman et al. |
| 5,704,200 A | 1/1998 | Chmielewski, Jr. et al. |
| 5,768,870 A * | 6/1998 | Talbot et al. .......... 56/364 |
| 5,791,128 A | 8/1998 | Rogalsky |
| 5,927,606 A | 7/1999 | Patterson |
| 5,987,861 A * | 11/1999 | Duncan et al. .......... 56/14.4 |
| 5,992,759 A | 11/1999 | Patterson |
| 6,029,429 A | 2/2000 | Fox et al. |
| 6,044,636 A * | 4/2000 | Minnaert .......... 56/220 |
| 6,079,194 A | 6/2000 | Waldrop |
| 6,170,244 B1 * | 1/2001 | Coers et al. .......... 56/226 |
| 6,195,972 B1 | 3/2001 | Talbot et al. |
| 6,199,358 B1 | 3/2001 | Majkrzak |
| 6,282,876 B1 | 9/2001 | Patterson |
| 6,324,823 B1 | 12/2001 | Remillard |
| 6,351,931 B1 | 3/2002 | Shearer |
| 6,397,573 B2 | 6/2002 | Majkrzak |
| 6,442,918 B1 | 9/2002 | Fox |
| 6,453,655 B2 | 9/2002 | Ferraris |
| 6,502,379 B1 * | 1/2003 | Snider .......... 56/221 |
| 6,519,923 B1 | 2/2003 | Cooksey et al. |
| 6,530,202 B1 | 3/2003 | Guyer |
| 6,543,211 B1 | 4/2003 | Talbot |
| 6,591,598 B2 | 7/2003 | Remillard et al. |
| 6,675,568 B2 | 1/2004 | Patterson et al. |
| 6,698,175 B1 | 3/2004 | Schumacher et al. |
| 6,708,475 B2 * | 3/2004 | Guyer .......... 56/220 |
| 6,817,166 B2 | 11/2004 | Dunn |
| 6,843,045 B2 | 1/2005 | Bickel |
| 6,854,251 B2 | 2/2005 | Snider |
| 6,865,871 B2 | 3/2005 | Patterson et al. |
| 6,889,492 B1 | 5/2005 | Polk et al. |
| 6,962,040 B2 | 11/2005 | Talbot |
| 7,077,220 B2 | 7/2006 | Dunn et al. |
| 7,131,253 B2 * | 11/2006 | Remillard et al. .......... 56/14.4 |
| 7,159,687 B2 | 1/2007 | Dunn et al. |
| 7,188,461 B2 | 3/2007 | Fox et al. |
| 7,197,865 B1 | 4/2007 | Enns et al. |
| 7,306,062 B2 | 12/2007 | Dunn |
| 7,306,252 B2 | 12/2007 | Barnett |
| 7,308,947 B2 | 12/2007 | Barnett |
| 7,322,175 B2 | 1/2008 | Ferre et al. |
| 7,328,565 B2 | 2/2008 | Snider et al. |
| 7,340,876 B1 | 3/2008 | Barnett |
| 7,347,277 B2 | 3/2008 | Enns et al. |
| 7,356,982 B2 | 4/2008 | Barnett |
| 7,364,181 B2 | 4/2008 | Patterson |
| 7,373,769 B2 | 5/2008 | Talbot et al. |
| 7,392,124 B2 | 6/2008 | MacGregor et al. |
| 7,392,646 B2 | 7/2008 | Patterson |
| 7,438,305 B2 | 10/2008 | Schulz |
| 7,444,798 B2 | 11/2008 | Patterson et al. |
| 7,454,888 B2 | 11/2008 | Barnett |
| 7,461,498 B1 | 12/2008 | Barnett |
| 7,467,505 B2 | 12/2008 | MacGregor |
| 7,472,533 B2 | 1/2009 | Talbot et al. |
| 7,484,349 B2 | 2/2009 | Talbot et al. |
| 7,497,069 B2 | 3/2009 | Enns et al. |
| 7,647,755 B2 | 1/2010 | Barnett et al. |
| 7,721,830 B2 | 5/2010 | Dunn et al. |
| 7,730,707 B2 | 6/2010 | Pietricola et al. |
| 7,849,952 B2 | 12/2010 | MacGregor et al. |
| 7,856,801 B2 | 12/2010 | Remillard |
| 7,918,076 B2 | 4/2011 | Talbot |
| 7,958,706 B2 | 6/2011 | Remillard et al. |
| 8,006,469 B2 | 8/2011 | Barnett |
| 8,015,784 B2 | 9/2011 | Barnett et al. |
| 8,020,363 B1 | 9/2011 | Barnett et al. |
| 8,020,648 B2 | 9/2011 | Otto |
| 8,056,311 B1 | 11/2011 | Barnett |
| 8,069,640 B2 | 12/2011 | Barnett et al. |
| 8,096,102 B2 | 1/2012 | Smith |
| 8,117,812 B2 | 2/2012 | Patterson |
| 8,161,719 B2 | 4/2012 | Barnett et al. |
| 8,176,716 B2 | 5/2012 | Coers et al. |
| 8,225,589 B2 | 7/2012 | Barnett |
| 8,225,903 B2 | 7/2012 | Dunn |
| 8,240,114 B2 | 8/2012 | Barnett |
| 8,245,489 B2 | 8/2012 | Talbot |
| 8,286,411 B2 | 10/2012 | Barnett et al. |
| 8,286,412 B2 | 10/2012 | Kidd et al. |
| 8,291,684 B2 | 10/2012 | Remillard et al. |
| 8,291,686 B1 | 10/2012 | Cormier et al. |
| 8,307,620 B1 | 11/2012 | Barnett et al. |
| 8,333,057 B2 | 12/2012 | Schroeder et al. |
| 8,341,927 B2 | 1/2013 | Barnett |
| 8,387,351 B2 | 3/2013 | Guyer |
| 8,402,728 B2 | 3/2013 | Kidd |
| 8,408,567 B2 | 4/2013 | Bergman et al. |
| 8,434,290 B2 | 5/2013 | Barnett et al. |
| 8,468,789 B2 | 6/2013 | Barnett et al. |
| 8,484,938 B2 | 7/2013 | Cormier et al. |
| 8,484,939 B1 | 7/2013 | Cormier et al. |
| 8,511,050 B1 | 8/2013 | Cormier et al. |
| 8,590,284 B2 | 11/2013 | Rayfield |
| 2002/0148210 A1 * | 10/2002 | Bickel .......... 56/14.4 |
| 2003/0061794 A1 * | 4/2003 | Remillard et al. .......... 56/14.4 |
| 2004/0139715 A1 * | 7/2004 | Bickel .......... 56/220 |
| 2008/0022647 A1 * | 1/2008 | Jones .......... 56/220 |
| 2012/0251653 A1 | 10/2012 | Mathy, Jr. et al. |
| 2012/0260870 A1 | 10/2012 | Wahl et al. |
| 2013/0036860 A1 | 2/2013 | Corniani |
| 2014/0001726 A1 | 1/2014 | Statz |

(56) References Cited

U.S. PATENT DOCUMENTS

| | | |
|---|---|---|
| 2014/0033940 A1 | 2/2014 | Simpson et al. |
| 2014/0150601 A1 | 6/2014 | McGrath |

FOREIGN PATENT DOCUMENTS

| | | |
|---|---|---|
| CA | 1043577 | 12/1978 |
| CA | 2180627 | 1/1980 |
| CA | 1086508 | 9/1980 |
| CA | 1087402 | 10/1980 |
| CA | 1185438 | 4/1985 |
| CA | 1197694 | 12/1985 |
| CA | 1318135 | 5/1993 |
| CA | 2100204 | 1/1995 |
| CA | 2126909 | 1/1995 |
| CA | 2138939 | 6/1996 |
| CA | 2165735 | 6/1997 |
| CA | 2180625 | 1/1998 |
| CA | 2180626 | 1/1998 |
| CA | 2211363 | 1/1998 |
| CA | 2198672 | 8/1998 |
| CA | 2226200 | 11/1998 |
| CA | 2229152 | 8/1999 |
| CA | 2245213 | 2/2000 |
| CA | 2280681 | 2/2000 |
| CA | 2184278 | 8/2000 |
| CA | 2289164 | 10/2000 |
| CA | 2289171 | 10/2000 |
| CA | 2284432 | 4/2001 |
| CA | 2284436 | 4/2001 |
| CA | 2320379 | 5/2001 |
| CA | 2307176 | 10/2001 |
| CA | 2311019 | 12/2001 |
| CA | 2320524 | 3/2002 |
| CA | 2357825 | 9/2002 |
| CA | 2380557 | 10/2002 |
| CA | 2387898 | 12/2002 |
| CA | 2358883 | 4/2003 |
| CA | 2359598 | 4/2003 |
| CA | 2370891 | 4/2003 |
| CA | 2399234 | 6/2003 |
| CA | 2389513 | 12/2003 |
| CA | 2406416 | 4/2004 |
| CA | 2406419 | 4/2004 |
| CA | 2427755 | 11/2004 |
| CA | 2461790 | 11/2004 |
| CA | 2467595 | 12/2004 |
| CA | 2434981 | 1/2005 |
| CA | 2510883 | 12/2005 |
| CA | 2513037 | 2/2006 |
| CA | 2341283 | 3/2006 |
| CA | 2494395 | 6/2006 |
| CA | 2494034 | 7/2006 |
| CA | 2505431 | 9/2006 |
| CA | 2505458 | 9/2006 |
| CA | 2531189 | 9/2006 |
| CA | 2513605 | 1/2007 |
| CA | 2513614 | 1/2007 |
| CA | 2528731 | 1/2007 |
| CA | 2743336 | 1/2007 |
| CA | 2521187 | 3/2007 |
| CA | 2522387 | 4/2007 |
| CA | 2524151 | 4/2007 |
| CA | 2525904 | 5/2007 |
| CA | 2527797 | 5/2007 |
| CA | 2534200 | 6/2007 |
| CA | 2538020 | 8/2007 |
| CA | 2554689 | 1/2008 |
| CA | 2596403 | 2/2008 |
| CA | 2559217 | 3/2008 |
| CA | 2559353 | 3/2008 |
| CA | 2561463 | 3/2008 |
| CA | 2609744 | 5/2008 |
| CA | 2627320 | 9/2008 |
| CA | 2626486 | 2/2009 |
| CA | 2639032 | 3/2009 |
| CA | 2783567 | 3/2009 |
| CA | 2587107 | 7/2009 |
| CA | 2627053 | 9/2009 |
| CA | 2578907 | 4/2010 |
| CA | 2671880 | 4/2010 |
| CA | 2564777 | 8/2010 |
| CA | 2695689 | 9/2010 |
| CA | 2665580 | 11/2010 |
| CA | 2665589 | 11/2010 |
| CA | 2706704 | 1/2011 |
| CA | 2706705 | 1/2011 |
| CA | 2706706 | 1/2011 |
| CA | 2706707 | 1/2011 |
| CA | 2775891 | 1/2011 |
| CA | 2783670 | 1/2011 |
| CA | 2713636 | 2/2011 |
| CA | 2596627 | 4/2011 |
| CA | 2686017 | 5/2011 |
| CA | 2721118 | 5/2011 |
| CA | 2739632 | 11/2011 |
| CA | 2708744 | 12/2011 |
| CA | 2745105 | 12/2011 |
| CA | 2538489 | 1/2012 |
| CA | 2707624 | 1/2012 |
| CA | 2709336 | 1/2012 |
| CA | 2710676 | 2/2012 |
| CA | 2734475 | 5/2012 |
| CA | 2766611 | 7/2012 |
| CA | 2744070 | 12/2012 |
| CA | 2802894 | 1/2013 |
| CA | 2796109 | 5/2013 |
| CA | 2796120 | 5/2013 |
| CA | 2796131 | 5/2013 |
| CA | 2796134 | 5/2013 |
| CA | 2796177 | 5/2013 |
| CA | 2796165 | 6/2013 |
| CA | 2802958 | 7/2013 |
| CA | 2802963 | 7/2013 |
| CA | 2802972 | 7/2013 |
| CA | 2802975 | 7/2013 |
| CA | 2803470 | 7/2013 |
| CA | 2814924 | 10/2013 |
| CA | 2815395 | 10/2013 |
| CA | 2815408 | 10/2013 |
| CA | 2815421 | 10/2013 |
| CA | 2815427 | 10/2013 |
| EP | 1935226 | 6/2008 |
| WO | 2012/166629 | 12/2012 |

\* cited by examiner

HARVESTING CAM REEL WITH CONVERTIBLE TRANSPORT MODE

CROSS-REFERENCE TO RELATED APPLICATIONS

This application claims priority to Canadian Patent Application No. 2847456 filed on Mar. 26, 2014, the entire contents of which are incorporated herein.

TECHNICAL FIELD

This invention is in the field of harvesting equipment, and in particular for rotary reels on crop material harvesting or cutting headers and the drive systems used therefore.

BACKGROUND

It is known in the field of crop harvesting equipment to employ harvesting headers to cut crops for various purposes, such as feeding a combine harvester or swathing crop material.

At the front of a combine or swather is the portion referred to as the header. A typical header is equipped with a cutter bar, and a conveyor deck or surface behind the cutter bar onto which cut crop material will fall, and a rear wall of the header, which extends up from the rear of the crop catching surface.

The reel in a harvesting header is typically designed to be approximately the same width as the header. The reel shaft is mounted between two rotational mounts at either end thereof, with a power drive attached to rotate the reel shaft. There is then a plurality of reel bats with fingers that are equally spaced about the reel shaft, and held in position by a plurality of radially extending arms out from the shaft. Rotation of the reel shaft results in the rotation of the reel bats and fingers through the crop in front of the header, drawing the crop material into the cutter bar and the remainder of the device.

Harvesting headers now manufactured with fingers attached to the reel bats typically have the reel bats themselves rotatably mounted in relation to their attachment points, and include a cam mechanism that by selective or guided rotation of the reel bat during the rotation of the overall reel, allows the tips of the fingers to follow a more complex path, into, through and out of the crop material as the reel turns. The cams are of different shapes including circular or otherwise, dependent upon the path of travel that is desired for the fingers. Example of prior art patents in the area of the use of cam mechanisms to orient or adjust the orientation of the fingers on reel bats during the rotation of a harvesting header reel include U.S. Pat. Nos. 4,008,558 (Mott) and 5,768,870 (Talbot et al.).

Often the header or reel is transported by loading the header onto a transport trailer or other platform designed to orient the header lengthwise so it can be trailered in the direction of travel of a power unit such as a tractor or a truck. The size of many headers and their associated reel is such that there are many protruding parts, particularly the fingers along the top and crop facing face of the reel. These fingers are often made of plastic or other shearable material, which allows for simpler maintenance of the reel.

The design of prior art reels is such that the fingers, particularly those facing the crop entry and cutting area, are oriented in a fully outstretched or radial direction as they need to be in order to provide maximum engagement with crop material. However, this creates a problem during transport of the header since extended fingers are more susceptible to damage and breakage due to be exposed. As a result, many times following transport the first task that must be undertaken before the header can be used again is to replace any broken or bent fingers as a result of the transport. The same issue of protruding components exists in circumstances where the header and associated reel are transported in operating position on the harvesting unit.

Accordingly, a harvesting header reel that minimized the protruding profile of the bat fingers during transport would be desirable as a means of minimizing damage.

SUMMARY OF THE INVENTION

The present disclosure is generally directed to the concept of a cam reel that has a operating mode and a convertible transport mode, whereby the reel bats can be moved to a position such that protrusion of fingers, and the risk of damage to the same, will be minimized when in the transport mode.

The key differentiator of the present disclosure from prior art harvesting header and cam reel combinations in the prior art is in the cam system that is used. The crop-harvesting header as disclosed herein includes a reel for moving crop material into the cutter bar and onto the conveyor deck. The reel includes a reel shaft that has a first end and a second end and a reel axis. The reel shaft is rotatably mounted to and between the reel ends of the frame, and also has a rotational power source connected thereto for the purpose of rotation of the reel shaft in operation of the header. When rotational power is applied to the reel shaft during operation of the header, the reel rotates around the reel axis defined by the shaft to provide the sweeping action necessary to engage the crop being harvested.

The reel will also include a plurality of reel bats that are mounted in spaced apart positions around the circumference of the reel shaft. Each reel bat comprises a bat member with a bat axis, and a plurality of crop fingers attached thereto and extending generally radially outwardly from the reel shaft. The crop fingers will engage the crop material as the header and the reel on the front of the header are moved through a standing crop.

The reel bats as outlined are attached in spaced apart positions around the circumference of the reel shaft. It is specifically contemplated that each reel bat is attached by, and corresponds to, a plurality of radial arms extending outwardly from the reel shaft. These radial arms that attach the reel bats in a typical cam reel design are sometimes interchangeably referred to as "spiders" in the prior art as well. It is specifically contemplated that at least two radial arms would be required for the mounting of each reel bat to the reel shaft, one of each pair of such at least two radial arms being in proximity to each end of the reel shaft and the bat member. For increased rigidity or stability in the construction of the remainder of the reel however, any number of radial arms could be used to attach each reel bat. The radial arms for all of the reel bats would be generally the same length as well of the bat arms for each reel bat, and the reel ends of the radial arms would define when viewed from the side a circular bat path through which the radial arms would move during rotation of the reel shaft.

The invention also provides that the cam assembly is adjustable between one or more operating positions, and a transport position. When in the transport position, the cam will be rotated such that the cam followers rotate the bats and fingers so that fingers, especially those at the front of the header and which are most susceptible to damage, will be rotated generally inwards, protecting them from damage and/or contact with persons or structures as can occur in prior art systems.

Thus, in some embodiments, the present disclosure provides a crop harvesting header for the harvesting of crop material, said crop harvesting header comprising: a frame for movement in a travel direction across a crop field, said frame having two reel ends defining the cutting width of the header; a transverse conveyor deck extending between the reel ends of the frame, the conveyor deck carrying a conveyor system which will move cut crop material along the conveyor deck to a header discharge; a cutter bar along the forward edge of the conveyor deck, which will cut crop material engaged by the header moving under power through the crop; and a reel for moving crop material into the cutter bar and onto the conveyor deck, wherein the reel comprises: a reel shaft having a first end and a second end and a reel axis, rotatably mounted to and between the reel ends of the frame; rotational power source connected to the reel shaft to rotate the reel; a plurality of reel bats each of which has a plurality of crop fingers attached thereon extending generally radially outwardly from the reel shaft, the reel bats being mounted in spaced apart positions around the circumference of the reel shaft; a plurality of radial arms extending outward from the reel shaft corresponding to each reel bat, each reel bat being rotatably attached at the distal ends of the corresponding radial arms such that the reel bat can rotate freely around a bat axis extending through the distal ends of the radial arms; a cam mounted on the frame perpendicular to the reel axis near the first end of the reel shaft; a cam follower corresponding to each reel bat which is pivotally attached at one end to the reel bat and at a second end engages the cam so that it can follow the cam and exert rotational force on the reel bat to pivot the reel bat around the bat axis as the reel is rotated; wherein the cam has at least one operating position in which it can be selectably positioned, wherein upon positioning of the cam in the at least one operating position the resultant positioning of the cam followers and the reel bats will extend the fingers generally radially outwardly from the reel shaft so that the fingers will be positioned to engage the crop material; and wherein the cam is further positionable in a transport position, wherein upon positioning of the cam in the transport position the resultant positioning of the cam followers and reel bats will rotate the fingers such that the fingers are substantially protected from damage during transport of the header.

In some embodiments, the number of operating positions is one. In some embodiments, the number of operating positions is more than one.

In some embodiments, the cam comprises a cam disc rotatably mounted to the frame around the first end of the reel shaft, and a lock to lock the cam in the selected operating or transport position.

In some embodiments, a crop harvesting header further comprises: a second cam mounted on the frame perpendicular to the reel axis near the second end of the reel shaft; and a second cam follower corresponding to each reel bat which is pivotally attached at one end to the reel bat and at a second end engages the second cam so that it can follow the second cam and exert rotational force on the reel bat to pivot the reel bat around the bat axis as the reel is rotated; wherein the second cam mirrors in shape and mounting at the second end the shape and mounting of the cam mounted at the first end, to avoid excessive torsional force on the reel bats as the reel is rotated; wherein the second cam has at least one operating position in which it can be selectably positioned, wherein upon positioning of the second cam in the at least one operating position the resultant positioning of the second cam followers and the reel bats will extend the fingers generally radially outwardly from the reel shaft so that the fingers will be positioned to engage the crop material; and wherein the second cam is further positionable in a transport position, wherein upon positioning of the second cam in the transport position the resultant positioning of the second cam followers and reel bats will rotate the fingers such that the fingers are substantially protected from damage during transport of the header.

In embodiments comprising a second cam, the number of operating positions is one. In embodiments comprising a second cam the number of operating positions is more than one.

In some embodiments, the second cam comprises a second cam disc rotatably mounted to the frame around the second end of the reel shaft, and a second cam lock to lock the second cam in the selected operating or transport position.

In some embodiments, the at least one operating position and transport position of the cam are indicated by a plurality of lock-engaging holes extending through the cam disc, and the lock comprises a locking pin that can be extended through a lock-engaging hole in the cam disc to a locking hole in the frame.

In some embodiments, the at least one operating position and transport position of the second cam are indicated by a plurality of lock-engaging holes extending through the second cam disc, and the second cam lock comprises a locking pin which can be extended through a lock-engaging hole in the cam disc to a locking hole in the frame.

In some embodiments, when the cam is in the transport position, the fingers of the reel bats are generally retracted into position along a path defined by the distal ends of the radial arms.

In some embodiments, the crop-harvesting header further comprises a reel lock, effective to prevent rotation of the reel during transport.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numerals, and where:

DETAILED DESCRIPTION OF THE INVENTION

The following discussion provides many example embodiments of the inventive subject matter. Although each embodiment represents a single combination of inventive elements, the inventive subject matter is considered to include all possible combinations of the disclosed elements.

Harvesting headers, as outlined elsewhere herein and understood to those skilled in the art of crop harvesting technology are the cutting face attachment which is typically used either with a swather or windrowing machine, or with a combine harvester or the like. The header typically includes a reel rotatably mounted approximately perpendicular to the operating direction of travel of the implement, which will when rotated feed crop material from the field into a cutter bar mounted along the front of the header, and once it passes over the cutter bar and is cut, deposit that cut crop material into an auger or onto a draper conveyor which will feed it either to a discharge in the case of this water when growing machine, or into the throat of a combine harvester etc.

Different types of headers have been developed over the years that behave differently in different types of crop material as well as are of varying construction and width. The width of the header is one of the primary determining factors of the speed of harvesting, since a wider header can cut a wider windrow or swath such that fewer passes will be required in order to process a a crop in a field. As outlined above and as is understood to those skilled in the art of the manufacturing operation of harvesting equipment, over the last number of years reel assemblies that use a cam construction at the ends of the reel to rotatably orient the reel bats and the fingers thereon during rotation of the reel have become the norm.

Figure 1:
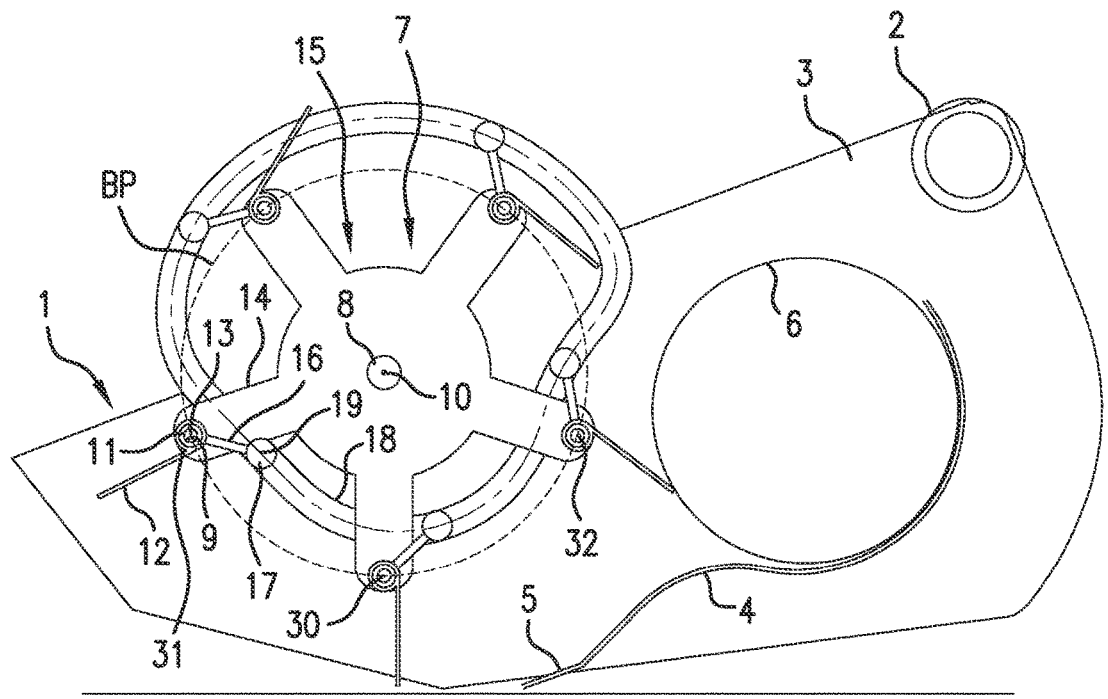
FIG. 1 is a schematic side elevational view of a prior art cam reel of a harvesting header.

FIG. 1 depicts a schematic side elevational view of a prior art cam reel of a harvesting header. This Figure has been extracted from Canadian Patent No. 2,358,883. Many of the components of the typical harvesting header are demonstrated in this figure and it is shown for this purpose as well to inform the understanding of the reader in the general state of the art and the technology.

The general configuration of the header includes a frame structure, shown at 1, which includes a main beam 2 extending across the width of the frame 1 and two end frame members 3, which extend forward from the rear of the header and away from the main beam 2.

The frame structure 1 also includes a deck 4 onto which crop material after it is cut is placed. The deck 4 extends between the end frame members 3. There is a cutter bar 5 shown as well, along the front of the deck 4, which will cut the crop material as the reel feeds it therein. The harvesting header shown employs an auger 6 for the feeding of crop material to the discharge or throat across the deck 4. Other types of headers use a draper conveyor in place of or in addition to an auger 6 and both such approaches will be understood to be contemplated within the scope of the present invention in terms of utility or applicability of the cam reel configuration of the present invention.

In addition to the transverse conveyor deck 4, which extends between the end frame members 3, there is also a reel 7 that extends across the width of the header above and reaching forward of the cutter bar 5. This conventional reel 7 includes a shaft 8 that is rotationally attached to the end frame members 3 so that the position of the shaft 8 is fixed relative to the cutter bar 5. The reel 7 also includes a plurality of reel bats 9 which are in equally spaced positions around the axis 10 of the shaft 8. The reel bats 9 are rotatably attached so that they can rotate within their mountings as the shaft 8 and the reel 7 are rotated during operation. In the embodiment shown, each of the bats 9 comprises a bat tube 11 with a plurality of fingers 12 attached thereto which extend radially outward from the tube 11, and the shaft 8, at a predetermined angle. The plurality of fingers 12 are spaced in positions along the length of the bat 9, with all of the fingers being arranged at a similar angle in relation to the axis 13 of the bat 11.

The bat tubes 11 are mounted to a plurality of radial support arms 14, extending outwardly from the shaft 8. In this particular case a support plate 15 is shown attaching these radial arms 14 to the shaft 8. The number of radial arms 14 spaced around the shaft 8 will vary dependent upon the number of bats 9 which are used in the particular reel configuration. As well, the number of support plate and radial arm combinations spaced along the length of the shaft would be varied based upon the width of the header and the amount of support required by the reel bats 9.

The bat tubes 11 are rotationally mounted to their radial arms 14, so that they can turn in relation to their axis 13 while remaining attached thereto.

Each of the bat tubes 11 is attached to or includes a crank arm 16, which is attached to the tube 11 in such a way that the inner end of the crank arm 16 will rotate with the tube 11 around the axis 13 of the tube. Each crank arm 16 includes a cam follower 17 and its outer end, which is capable of engaging a cam track 18. The cam follower 17 itself has a cam follower axis 19 about which it can rotate. The crank arm 16 is attached to provide the application of rotational force to the tube 11 during the operation of the reel 7.

Many different types of cam followers and corresponding cam track configurations or pairings will be understood. The cam track 18 defines a path around the axis 8 of the reel but is offset from the axis 8 and in this case is non-circular, so that the crank arms 16 will move and they will rotate around their respective bat axis 13 and generate a particular pattern of movement of the fingers 12 attached to that bat 9 as the reel 7 rotates. By changing the shape of the cam track 18 the behavior of the fingers 12 during rotation of the reel 7 can be modified.

In operation when the shaft 8 is rotated the reel 7 will be actuated. As the shaft 8 is rotated, the radial arms 14 will rotate with the bat tubes 11 attached at their ends. Those reel bats 9 will turn in a circle of constant radius defined by the distance between the axis 10 of the shaft 8 and the axis 13 of the reel bats 9. This is the bat path BP. The bat path (BP) of this particular reel design is shown by dotted circle in this Figure. Overall it will be understood that the behavior of the bats 9 in rotation of the reel 7 in this embodiment and similar embodiments will be that the bats 9 themselves will travel around circular bat path BP and the only change in behavior of the fingers 12 would be generated by the rotation of the tubes 11 of the bats 9 within their rotational attachments on the radial arms 14.

Operating and Transport Configurations

There are a number of prior art reel and header combinations which include fingers mounted on rotatable bat tubes. For example, the example of a prior art cam reel shown in FIG. 1 provides for a plurality of fingers 12 mounted on bat tubes 11, which are mounted to be rotated in response to the operation of the cam as described above in reference to FIG. 1. One limitation of these header designs is that by definition, those rows of fingers on bats positioned at the front of the reel will extend past the reel. This can be easily seen in FIG. 2, where the fingers 34 are most extended radially from the reel axis at the front of the reel (the left side of the drawing). This positioning is desirable in the operating configuration as it sets the fingers at an angle to more efficiently engage and sweep the crop towards the header table as the reel rotates, as can be appreciated in the illustration. The illustration depicts the position of a finger at intervals of time during the course of a rotation of the reel, the reel rotating in a counterclockwise direction in this particular depiction.

While this is a desired position during operation of the combine header as it properly positions the fingers to engage the crop being harvested, it is less desirable when the header is being transported, as a result of the fingers extending outwards from the reel. The fingers being extended past the body of the reel results in an increased potential for catching the fingers on structures, vehicles as the header is being transported, as well as risking injury to persons operating around the header. There is further risk of deforming and/or breaking off of fingers during transport given that they are in an unprotected position.

Figure 2:
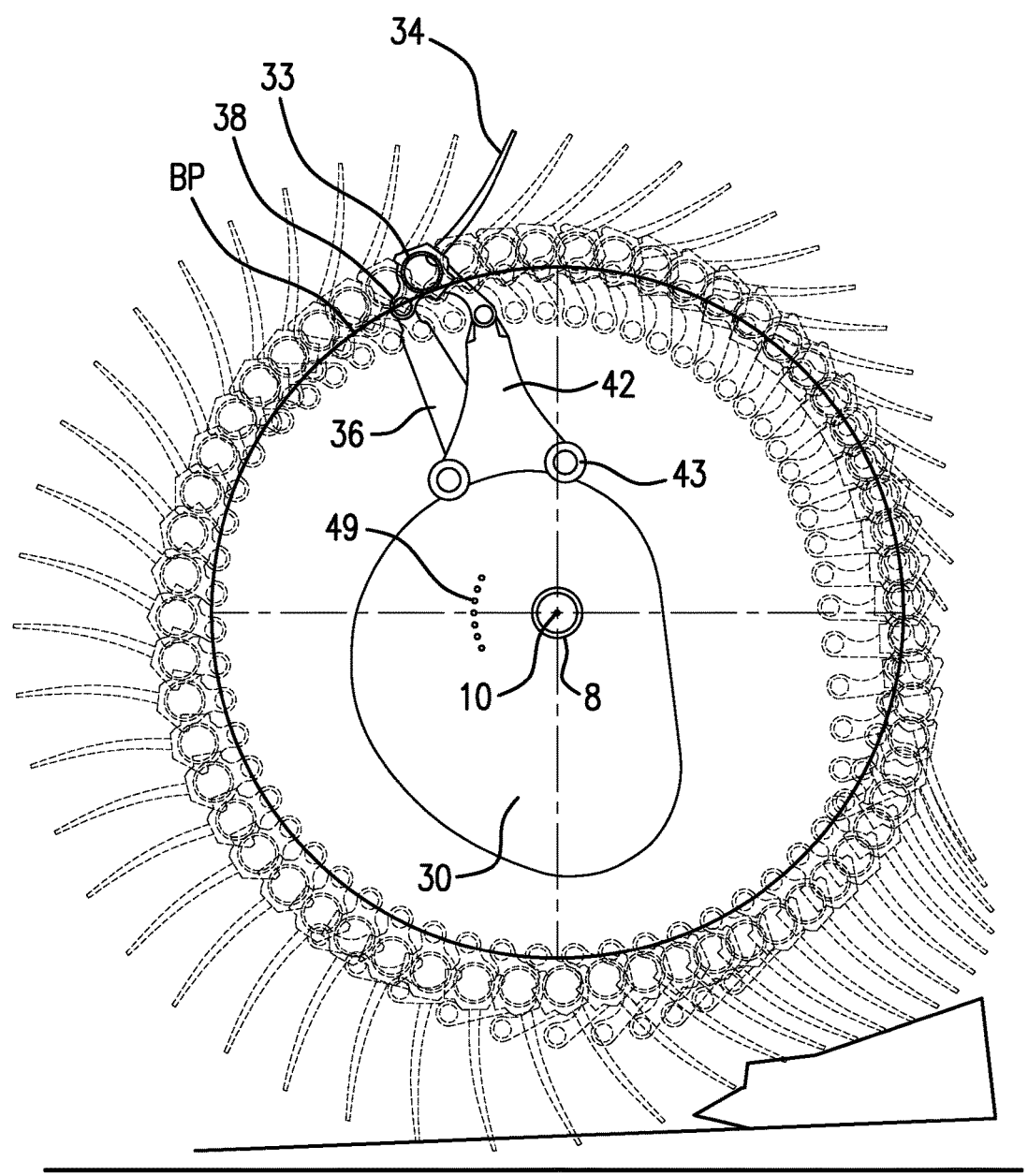
FIG. 2 is a side schematic side demonstrating the normal extension of the fingers when the reel is configured in an operating position.
Figure 3A:
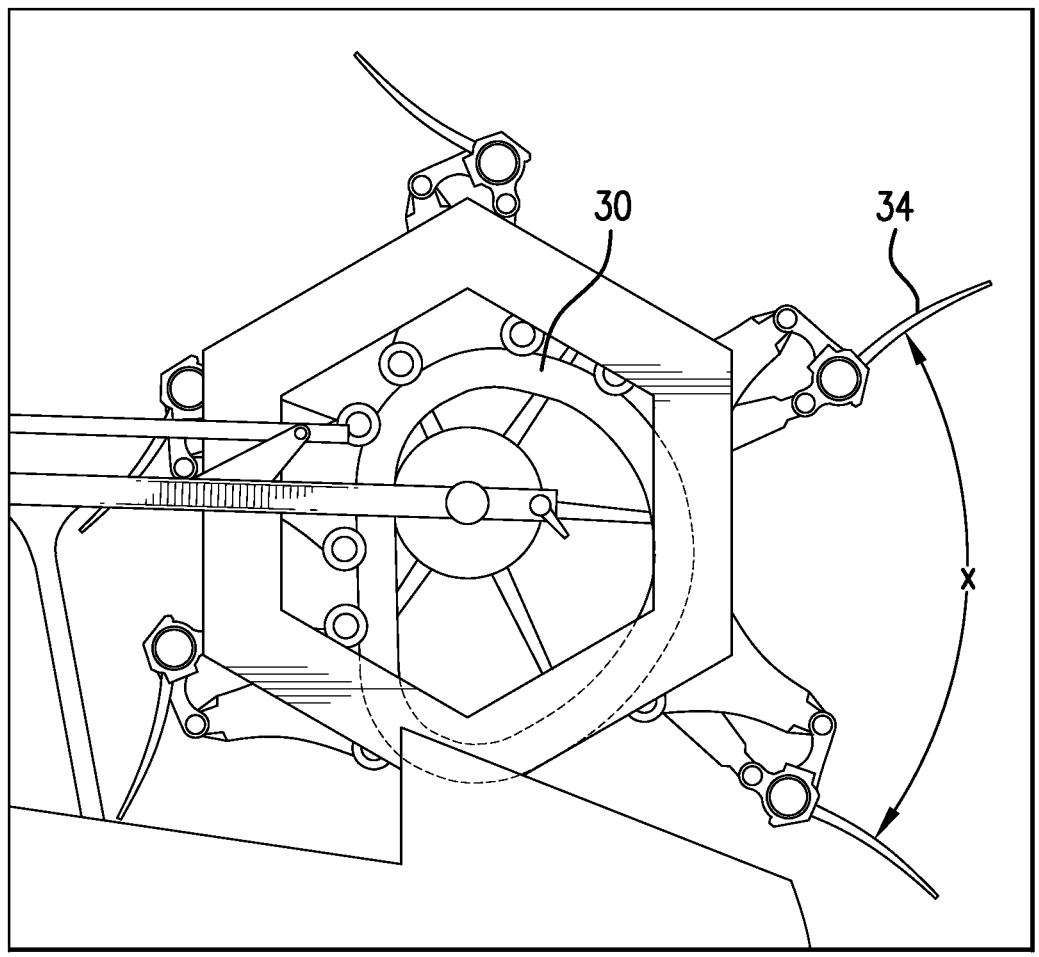
FIG. 3 is a side view of a reel with a complex bat path with adjustable cam mechanism that permits the reel to be configured between an operating position (A) and a transport position (B)
Figure 3B:
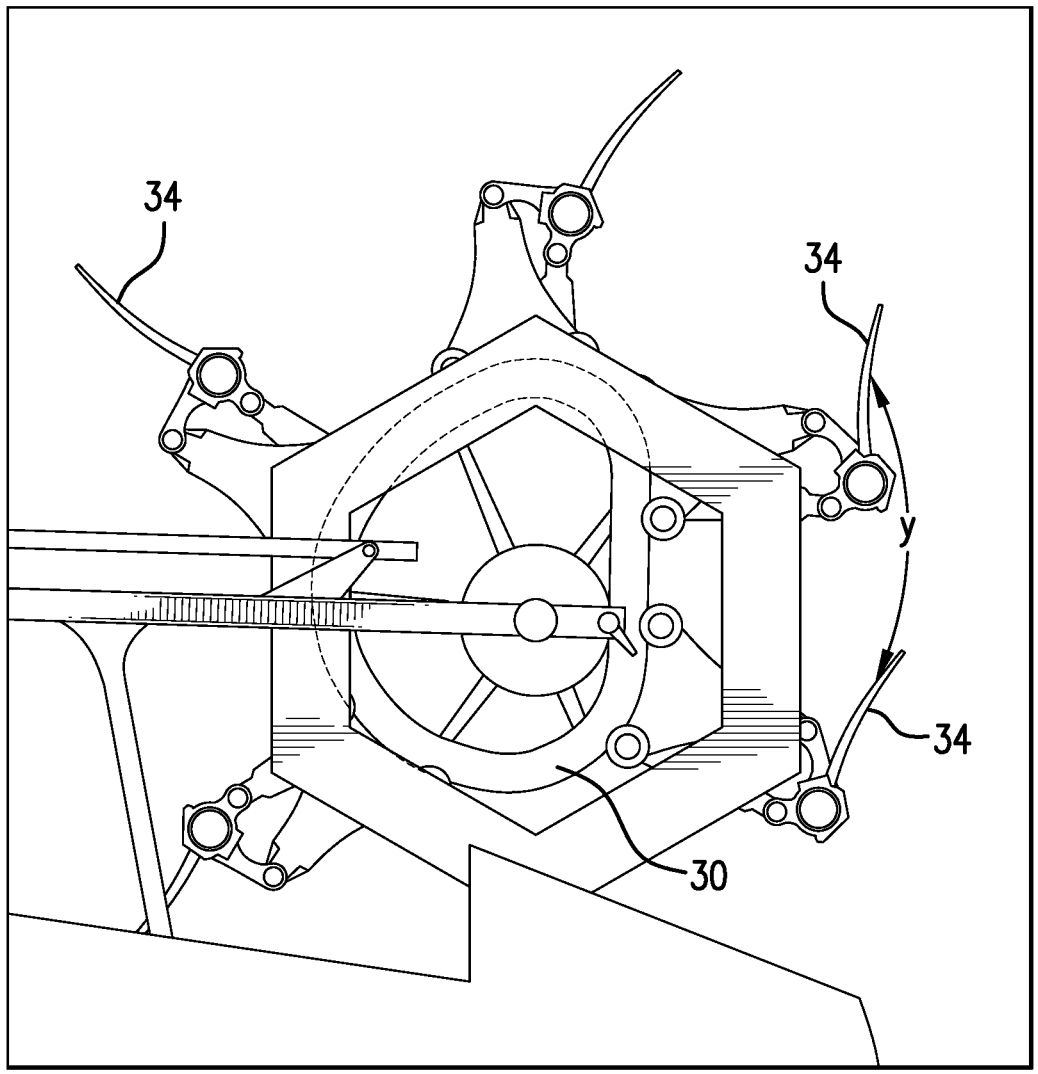
Figure 4A:
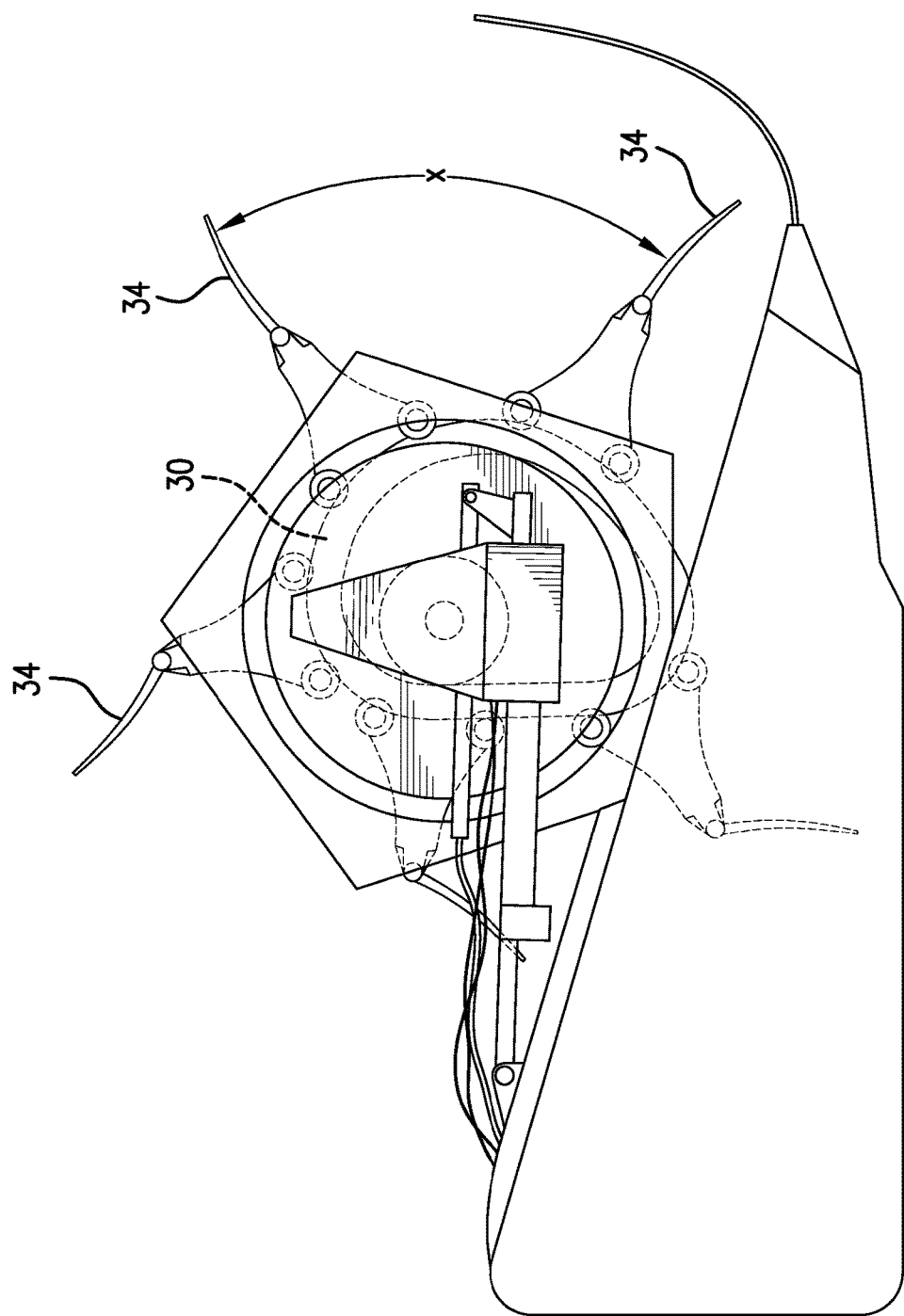
FIG. 4 is a side view of a prior art reel made to be configurable in an operating position (A) and a transport position (B) using an adjustable cam system of the present invention.

In the present invention, the cam is further adjustable between a operating position and a transport position. As shown in FIGS. 3 and 4, when the cam 30 is set in the operating position (A) the positioning of the cam will be moved relatively forward with respect to the reel. In the operating position this positioning of the cam will cause the cam followers to be positioned such that the reel bats of the front most bats will be rotated in such a manner so as to cause the fingers mounted on the bat tube to extend generally radially outward from the reel shaft, as is also shown in FIG. 2. Thus, as shown in FIGS. 3A and 4A, selecting the operating position for the cam results in orientation of the fingers 34 such that fingers on bats positioned at the front most portion of the reel (two bat finger rows indicated as X) will extend outwards in the optimal configuration for engaging and moving the crop material rearwards towards the header table.

Figure 4B:
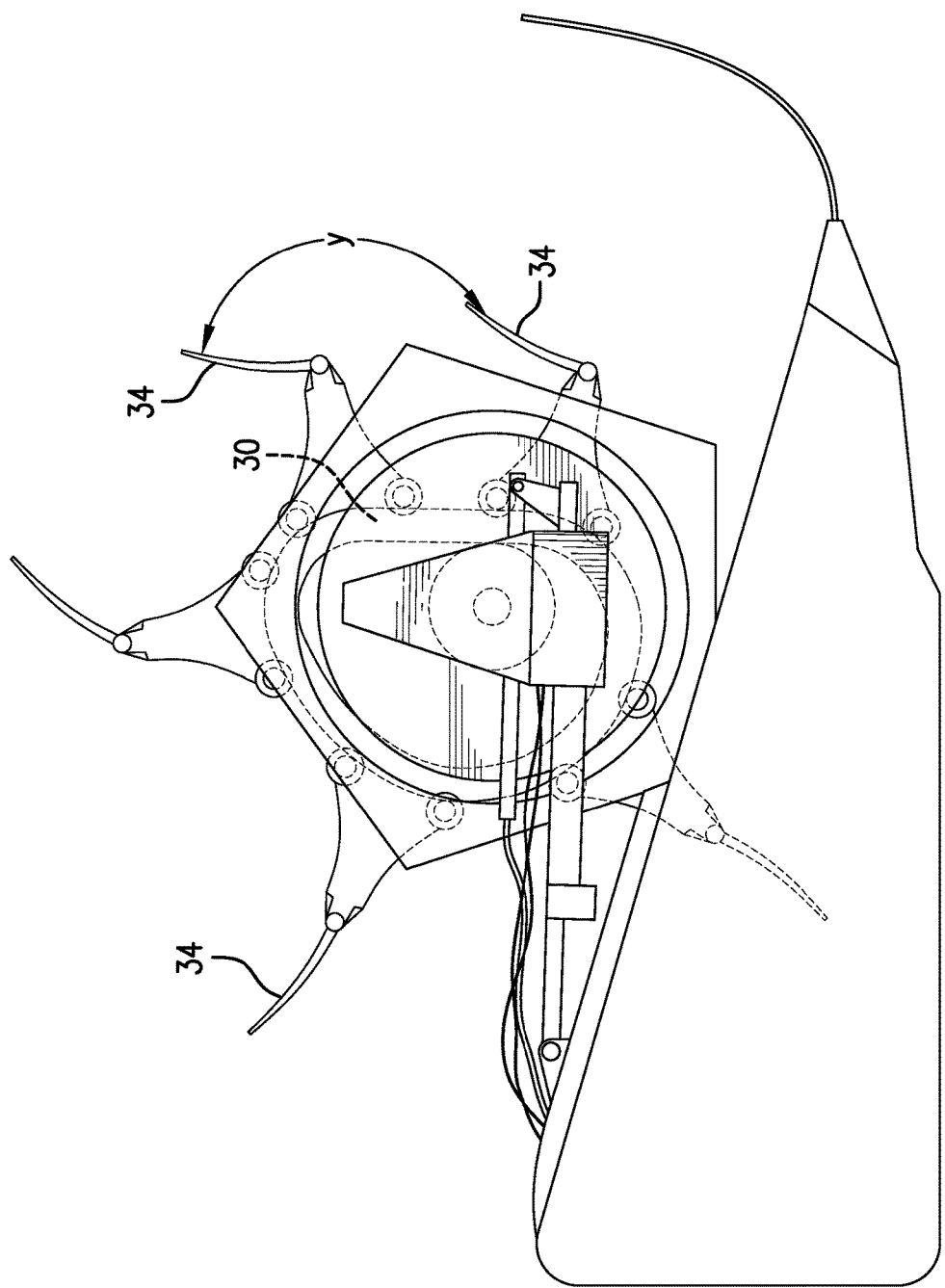

In contrast, when preparing the header for transport, a user will be able to select a transport position for the cam. As shown in FIGS. 3B and 4B, when the cam is placed in the transport position, the positioning of the cam will move rearward with respect to the reel and the operating position. This in turn positions the cam follower and the bats such that the fingers on the front most bats that would be extended in the operation positions, are now rotated substantially inwards (indicated by Y).

Conveniently, the present cam design that is configurable between operating and transport positions can be applied as an after market improvement to prior art reel designs (as shown in FIG. 4), or included with a novel reel design having a cam and follower design that produces a complex bat path when the reel is in operation (as shown in FIG. 3).

In the present design, it is also possible to have one or more operating positions. For example, depending on how aggressively one wishes to engage the crop, the positionable nature of the cam mechanism would allow a user to select one or more operating positions. In each operating position the finger would be generally oriented to extend radially outward with respect to the reel shaft at the point where the fingers would be expected to engage the crop being harvested.

As is also shown in FIG. 2, the cam can include a number of predetermined operating positions through which the cam positioning may be adjusted. As shown, a series of positioning holes 49 provide detents, or stops, defining a number of different operating positions. The holes may be engaged and the cam locked into position during operation by means of pins, bolts, or any other suitable engaging fastener to maintain the cam in the desired position. The various holes would permit adjustment of the operating behaviour of the reel and fingers 34, depending on the setting chose. Changing the positioning of the cam relative to the positioning holes can also be used to modify the bat path.

The present design also provides for there to be a locking mechanism in order to secure the cam position in any of the selectable positions, whether it be one or more possible operating positions, or in the transport position. In some cases, the locking mechanism can comprise a series of engagement holes in the cam disc as described above that can be put into alignment with a corresponding locking hole in the frame.

In some embodiments, the cam can be configured to be movable through about 180° of rotation in moving from an operating position to a transport position. The precise arc through which the cam is rotated is not critical to the advantage provided by this feature. It will therefore be apparent to those of skill in the art how much rotation is required in order to substantially rotate the front most bat fingers inwards whereby they are less likely to contact structures or persons during transport.

In addition, in some embodiments it may be preferable to provide a locking mechanism to secure the reel in place during transport in order to prevent rotation of the reel and possible damage to its components, such as the fingers. Like the methods for securing the reel cam in an operating position, the transport lock can make use of pins, locks and other fasteners known in the art in order to secure the reel and to prevent its movement when the header is being transported.

It will be apparent to those of skill in the art that by modification the present invention can be optimized for use in a wide range of conditions and applications, and in particular for different types of crops and various models of combine. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

The invention claimed is:

1. A harvesting header for harvesting crop material as the header is driven, the header comprising:
    an aggregator operable to receive and aggregate the crop material; and
    a reel rotatably connected to the aggregator such that said reel is operable to be disposed forward of said aggregator when the header is driven and the crop material is harvested, said reel being rotatable with respect to the aggregator about a reel axis, said reel including:
        a plurality of reel bats, each of the reel bats being spaced apart from the reel axis and pivotal about a respective bat axis, wherein each of the reel bats includes at least one finger extending generally away from said respective bat axis; and
        a reel bat positioner operable to vary an angular orientation of each of the reel bats about the bat axis dependent upon an angular position of the reel bat about the reel axis, said reel bat positioner being configurable between an operating configuration and a transport configuration;
    said header operable such that when the header is driven and the reel bat positioner is in the operating configuration, the reel bat positioner causes a first reel bat of the plurality of reel bats, having an angular position about the reel axis such that said first reel bat is disposed forward of the reel axis, to have an operating angular orientation about the bat axis wherein said at least one finger of said first reel bat extends substantially radially outwardly from and relative to the reel axis; and said header further operable such that when the header is stationary and configured for transportation above a surface and said reel bat positioner is in the transport configuration, the reel bat positioner causes the first reel bat having the angular position about the reel axis to have a transport angular orientation about the bat axis which differs from the operating angular orientation, wherein when said first reel bat is in said transport angular orientation, said at least one finger of said first reel bat is operable to extend upwardly relative to the surface such that said at least one finger is operable to be substantially protected from damage during transport of the header.

2. The header of claim 1 wherein said operating angular orientation of the first reel bat is a first reel bat operating angular orientation and said transport angular orientation of the first reel bat is a first reel bat transport angular orientation and wherein the header is further operable such that:

when the header is driven and the reel bat positioner is in the operating configuration, the reel bat positioner causes the first reel bat to have the first reel bat operating angular orientation and further causes a second reel bat of the plurality of reel bats to have a second reel bat operating angular orientation about the bat axis wherein said at least one finger of the second reel bat extends substantially radially outwardly from and relative to the reel axis; and when the header is stationary and configured for transportation above the surface and said reel bat positioner is in the transport configuration, the reel bat positioner causes the first reel bat to have the first reel bat transport angular orientation and causes the second reel bat to have a second reel bat transport orientation about the bat axis which differs from the second reel bat operating angular orientation, wherein when said second reel bat is in said second reel bat transport angular orientation, said at least one finger of said second reel bat is operable to extend upwardly relative to the surface such that said at least one finger is operable to be substantially protected from damage during transport of the header, said first reel bat transport angular orientation and said second reel bat transport angular orientation being substantially similar angles.

3. The header of claim 2 wherein the header is further operable such that when the header is stationary and configured for transportation above the surface and said reel bat positioner is in the transport configuration, said reel bat positioner causes said fingers of said first and second reel bats to be substantially aligned.

4. The header of claim 1 wherein the operating configuration is a first operating configuration and the reel bat positioner is configurable into one or more further operating configurations.

5. The header of claim 1 wherein the reel bat positioner is rotatably connected to the aggregator and wherein the reel bat positioner is rotatable between a positioner operating orientation wherein said reel bat positioner is in the operating configuration and a positioner transport orientation wherein said reel bat positioner is in the transport configuration.

6. The header of claim 5 further comprising a positioner lock operable to lock the reel bat positioner in the positioner operating orientation when the reel bat positioner is in the positioner operating orientation and operable to lock the reel bat positioner in the positioner transport orientation when the reel bat positioner is in the positioner transport orientation.

7. The header of claim 6 wherein the positioner lock comprises a locking pin operable to be extended through first and second lock-engaging holes of a plurality of lock engaging holes in the reel bat positioner to lock the reel bat positioner in the positioner operating orientation and the positioner transport orientation respectively.

8. The header of claim 5 wherein the reel bat positioner comprises:

a cam rotatably connected to the aggregator and rotatable between the positioner operating orientation and the positioner transport orientation; and respective cam followers engaged with the cam and coupled to each of the plurality of reel bats.

9. The header of claim 8 wherein the cam is a first cam disposed around a first end of the reel and the cam followers are first cam followers, and wherein the reel bat positioner comprises:

a second cam rotatably connected to the aggregator at around a second end of the reel and rotatable between the positioner operating orientation and the positioner transport orientation; and respective second cam followers engaged with the second cam and coupled to each of the plurality of reel bats.

10. The header of claim 9 further comprising first and second positioner locks operable to lock the first and second cams respectively in the positioner operating orientation when the reel bat positioner is in the positioner operating orientation and operable to lock the first and second cams respectively in the positioner transport orientation when the reel bat positioner is in the positioner transport orientation.

11. The header of claim 1 wherein the reel includes a plurality of radial arms holding the plurality of reel bats spaced apart from the reel axis and wherein when the reel bat positioner is in the transport configuration, the at least one finger of the first reel bat is generally retracted into a position within a path defined by distal ends of the radial arms.

12. The header of claim 1 further comprising a reel lock operable to prevent rotation of the reel about the reel axis during transport.

13. The header of claim 1 wherein the aggregator comprises an auger or a draper conveyor.

14. A method of transporting a header according to claim 1, the method comprising:

causing the reel bat positioner to change configuration from the operating configuration to the transport configuration; and transporting the header.

15. The method of claim 14 wherein transporting the header comprises disconnecting the header from a harvesting vehicle and loading the header onto a transporter for transport.

16. The method of claim 15 wherein the transporter is operable to move in a travel direction and wherein loading the header onto the transporter comprises causing the reel axis of the reel of the header to be substantially aligned with the travel direction.

17. A harvesting header for harvesting crop material as the header is driven, the header comprising:

an aggregator operable to receive and aggregate the crop material; and a reel rotatably connected to the aggregator such that said reel is operable to be disposed forward of said aggregator when the header is driven and the crop material is harvested, said reel being rotatable with respect to the aggregator about a reel axis, said reel including:
- a plurality of reel bats, each of the reel bats being spaced apart from the reel axis and pivotal about a respective bat axis, wherein each of the reel bats includes at least one finger extending generally away from said respective bat axis; and
- a reel bat positioner operable to vary an angular orientation of each of the reel bats about the bat axis dependent upon an angular position of the reel bat about the reel axis, said reel bat positioner being configurable between an operating configuration and a transport configuration;

said header operable such that when the header is driven and the reel bat positioner is in the operating configuration, the reel bat positioner causes a first reel bat of the plurality of reel bats, having an angular position about the reel axis such that said first reel bat is disposed forward of the reel axis, to have an operating angular orientation about the bat axis wherein said at least one finger of said first reel bat extends substantially radially outwardly from and relative to the reel axis; and said header further operable such that when the header is stationary and configured for transportation across a surface and said reel bat positioner is in the transport configuration, the reel bat positioner causes the first reel bat having the angular position about the reel axis to have a transport angular orientation about the bat axis which differs from the operating angular orientation, wherein when said first reel bat is in said transport angular orientation, said at least one finger of said first reel bat is operable to extend further from the surface when compared to said at least one finger of said first reel bat when said first reel is in the operating angular orientation such that said at least one finger is operable to be substantially protected from damage during transport of the header.

* * * * *